(12) United States Patent
Suguro

(10) Patent No.: US 6,459,916 B1
(45) Date of Patent: *Oct. 1, 2002

(54) PORTABLE RADIO COMMUNICATION DEVICE

(75) Inventor: Akihiro Suguro, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/068,189

(22) PCT Filed: Apr. 14, 1997

(86) PCT No.: PCT/JP97/01290

§ 371 (c)(1),
(2), (4) Date: Apr. 30, 1998

(87) PCT Pub. No.: WO97/39493

PCT Pub. Date: Oct. 23, 1997

(30) Foreign Application Priority Data

Apr. 16, 1996 (JP) ................................................ 8-94431
Apr. 16, 1996 (JP) ............................................. 8-094432

(51) Int. Cl.⁷ ................................................. H04B 1/38
(52) U.S. Cl. ........................ 455/575; 455/90; 455/550; 343/702
(58) Field of Search .......................... 455/90, 128, 269, 455/270, 351, 575, 273, 89, 277.1, 33.1, 550, 283, 284, 78, 101, 132–135, 140; 343/702, 725, 700, 796, 895, 701, 850

(56) References Cited

U.S. PATENT DOCUMENTS

| 3,906,509 | A | | 9/1975 | Duhamel | |
|---|---|---|---|---|---|
| 4,008,479 | A | | 2/1977 | Smith | |
| 4,011,567 | A | | 3/1977 | Ben-Dov | |
| 4,527,163 | A | * | 7/1985 | Stanton | ...................... 343/700 |
| 5,170,176 | A | * | 12/1992 | Yasunaga et al. ............ | 343/895 |
| 5,191,352 | A | * | 3/1993 | Branson ...................... | 343/895 |
| 5,198,831 | A | * | 3/1993 | Burrell et al. ............... | 343/895 |
| 5,255,001 | A | * | 10/1993 | Tamura et al. ............... | 343/702 |
| 5,349,365 | A | * | 9/1994 | Ow et al. .................... | 343/895 |
| 5,359,340 | A | | 10/1994 | Yokoto | |
| 5,403,197 | A | * | 4/1995 | Ernst et al. .................. | 439/165 |
| 5,463,406 | A | * | 10/1995 | Vannatta et al. ............. | 343/725 |
| 5,559,522 | A | * | 9/1996 | Seitz .......................... | 343/702 |
| 5,606,332 | A | * | 2/1997 | Darden, IV et al. ......... | 343/790 |
| 5,606,733 | A | * | 2/1997 | Kanayama et al. .......... | 455/273 |
| 5,701,591 | A | * | 12/1997 | Wong .......................... | 455/63 |

(List continued on next page.)

FOREIGN PATENT DOCUMENTS

| EP | 0955689 A1 | * | 4/1997 | ............ H01Q/9/04 |
|---|---|---|---|---|
| EP | 0847103 A2 | * | 10/1998 | .......... H01Q/21/30 |
| JP | 402224506 A | * | 9/1990 | .......... H01Q/21/00 |
| JP | 405299925 A | * | 11/1993 | ............ H01Q/3/24 |
| JP | 6338816 | | 12/1994 | ............ H04B/1/38 |
| JP | 07-079189 | | 3/1995 | |
| JP | 07-106999 | | 4/1995 | |
| JP | 09098018 A | * | 4/1997 | .......... H01Q/21/24 |
| JP | 09107238 A | * | 4/1997 | ............ H01Q/1/24 |
| JP | 10107542 A | * | 4/1998 | .......... H01Q/21/28 |
| WO | WO9309577 | | 5/1993 | ............ H01Q/1/24 |

*Primary Examiner*—Daniel Hunter
*Assistant Examiner*—Pablo N Tran
(74) *Attorney, Agent, or Firm*—Hogan & Hartson, L.L.P.

(57) ABSTRACT

A small-sized flat antenna mounted on a portable radio communication device is available for a narrow bandwidth, and the resonance frequency of the flat antenna varies due to interference between the flat antenna and surrounding dielectrics such as a housing and a human body. As a result, the transmission efficiency and reception sensitivity of the antenna have been impaired. A communicating section (constructed of a coaxial line or a microstrip line) is arranged in a portable radio communication device having a circularly polarized antenna for satellite communication, so that an appropriate distance is provided not only between a housing of the portable radio communication device and the antenna but also between a human body and the antenna.

5 Claims, 5 Drawing Sheets

U.S. PATENT DOCUMENTS

| | | | | |
|---|---|---|---|---|
| 5,754,146 A | * | 5/1998 | Knowles et al. | 343/895 |
| 5,818,398 A | * | 10/1998 | Tsuru et al. | 343/895 |
| 5,905,475 A | * | 5/1999 | Annamaa | 343/895 |
| 5,909,196 A | * | 6/1999 | O'Neill, Jr. | 343/895 |
| 5,923,305 A | * | 7/1999 | Sadler et al. | 343/895 |
| 5,945,963 A | * | 8/1999 | Liesten | 343/895 |
| 5,969,681 A | * | 10/1999 | O'Neill, Jr. | 343/700 MS |
| 5,986,616 A | * | 11/1999 | Edvardsson | 343/853 |
| 5,995,050 A | * | 11/1999 | Moller et al. | 343/702 |
| 6,005,521 A | * | 12/1999 | Suguro et al. | 343/700 |
| 6,021,317 A | * | 2/2000 | Irvin | 455/78 |
| 6,025,816 A | * | 2/2000 | Dent et al. | 343/895 |
| 6,052,088 A | * | 4/2000 | Simmons et al. | 343/702 |
| 6,054,966 A | * | 4/2000 | Haapala | 343/895 |
| 6,154,184 A | * | 11/2000 | Endo et al. | 343/895 |
| 6,160,512 A | * | 12/2000 | Desclos et al. | 343/700 MS |
| 6,163,302 A | * | 12/2000 | Bjorkengren et al. | 343/702 |
| 6,212,413 B1 | * | 4/2001 | Kiesi | 455/575 |
| 6,229,488 B1 | * | 5/2001 | Lin et al. | 343/700 MS |

* cited by examiner

FIG. 2
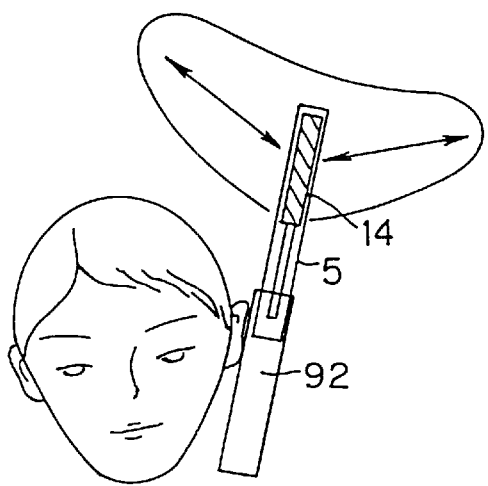
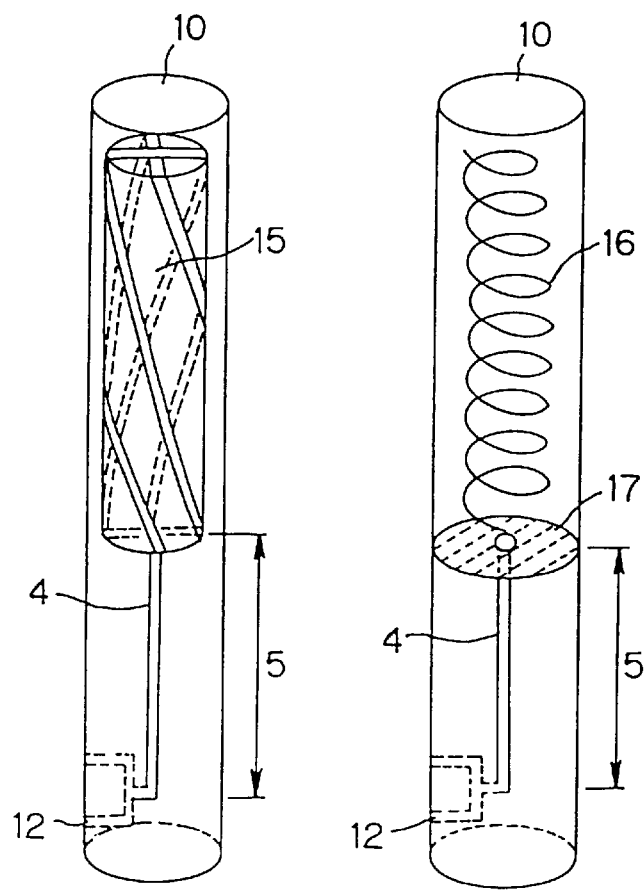
FIG. 3A  FIG. 3B

FIG. 5
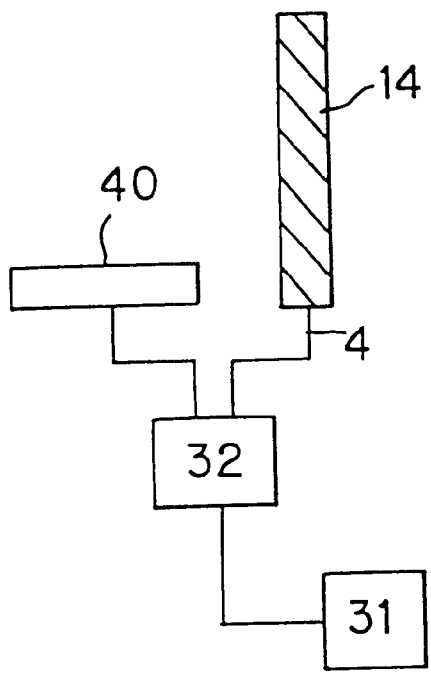
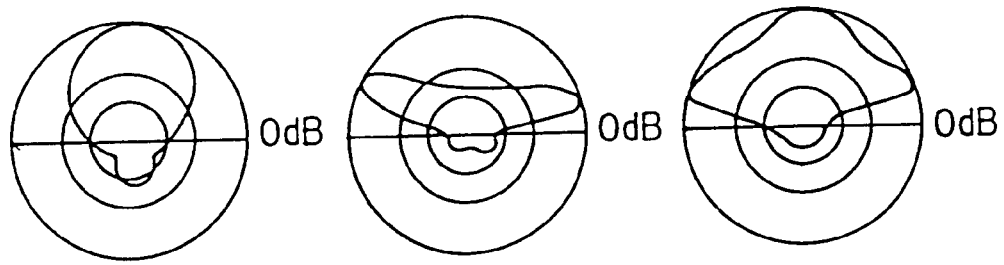
FIG. 6A   FIG. 6B   FIG. 6C

PORTABLE RADIO COMMUNICATION DEVICE

FIELD OF THE INVENTION

The present invention relates to a portable radio communication device having circularly polarized antennas effective for satellite communication.

BACKGROUND OF THE INVENTION

In mobile communication through portable radio communication devices (portable telephones) and the like, linearly polarized waves belonging to frequency bands of 800 MHz, 1.5 GHz, and 1.9 GHz are currently used. Portable telephones using medium-earth-orbit and low-earth-orbit satellites have been proposed by communications system companies in recent years, and for such mobile satellite communication, the following frequency band allocation systems has been schemed. One system allocates a frequency band of 1.6 GHz for uplink communication from portable telephones on the ground to satellites and a frequency band of 2.4 GHz for downlink communication from satellites to portable telephones on the ground. Another system allocates a frequency band of 1.6 GHz for both uplink and downlink communications. For such communication, circular polarization is generally used to guarantee the quality of radio communication lines.

Proposed as an exemplary antenna construction is, as shown in FIG. 7, a folding antenna array 25 (see "Nongeostationary geostationary Satellite Communication Systems of the World", ITU Research, No. 261/262, New Japan ITU Society, August 1993, p. 36). The folding antenna array 25 uses a transmitting microstrip flat antenna (hereinafter referred to as the "transmitting flat antenna) 22 and a receiving microstrip flat antenna (hereinafter referred to as the "receiving flat antenna) 23 for satellite communication.

The folding antenna array 25 will be described. For the sake of explanation, a construction proposed by the ODYSSEY system (TRW Corp. of the U.S) that is disclosed in the aforementioned literature "ITU Research" will be taken as an example. A portable telephone 92 shown in FIG. 7 has the folding antenna array 25 that has the transmitting flat antenna 22 and the receiving flat antenna 23 arranged on a dielectric. The folding antenna array 25 can be arbitrarily folded with respect to the portable telephone 92 at a folding angle α ranging from 0 to 180° through hinges 85.

In this case, the transmitting flat antenna 22 and the receiving flat antenna 23 communicate with a satellite using frequencies f1, f2, respectively. In the case of a satellite communication system using the same frequency f1 for both transmission and reception, only the transmitting flat antenna 22 can be used for both transmission and reception. Generally, the frequency f1 uses a frequency band of 1.6 GHz and the frequency f2 uses a frequency band of 2.4 GHz.

However, a small-sized flat antenna using a dielectric sheet has a narrow bandwidth, and the resonance frequency of the flat antenna varies due to interference between itself and surrounding dielectrics such as a housing and a human body. As a results the transmission efficiency and reception sensitivity of the antenna have been impaired. Especially, in the case of communicating with a low-earth-orbit satellite, loss in antenna gain caused by the head of a human body is addressed as a problem.

Further, communication sensitivity at low elevation angles is lost in the flat antenna when the main beam is directed toward the zenith (at an elevation angle of 90°). While the use of either the flat antenna or the helical antenna has been proposed in mobile communication through a communications satellite, satisfactory communication sensitivity can be obtained only either when the satellite is at low elevation angles or when the satellite is at high elevation angles due to restrictions on the directivity specific to each type of antenna.

The present invention has been made to overcome the aforementioned problem by preventing the nearing of an antenna element toward a human body (especially, the head) when the user uses a portable radio communication device. That is, in a circularly polarized antenna that is mounted on a portable radio communication device, a communicating section is arranged between the portable radio communication device and the antenna element.

Further, the present invention is characterized as providing two circularly polarized antennas on a portable radio communication device, and the main beam radiating direction of one of these antennas is made different from that of the other.

BRIEF DESCRIPTION OF THE DRAWINGS

FIG. 2 is a diagram showing a condition in which radiation from an antenna is not shielded by the head of a human body through the use of a portable telephone, which is the embodiment of the present invention;

FIG. 3A is a diagram illustrative of an antenna having a communicating section in a four-wire helical antenna FIG. 3B is a diagram illustrative of an antenna having a communicating section in a monofilar helical antenna;

FIG. 5 is a block diagram showing the antenna circuit for the helical antenna means and the flat antenna means;

FIG. 6A shows the relative power of the main beams of circularly polarized waves of the flat antenNa;

FIG. 6B shows the relative power of the main beams of circularly polarized waves of the helical antenna;

FIG. 6C shows the relative power of the synthesized main beams of FIGS. 6A and 6B;

DETAILED DESCRIPTION OF THE PREFERRED EMBODIMENTS

Figure 1:
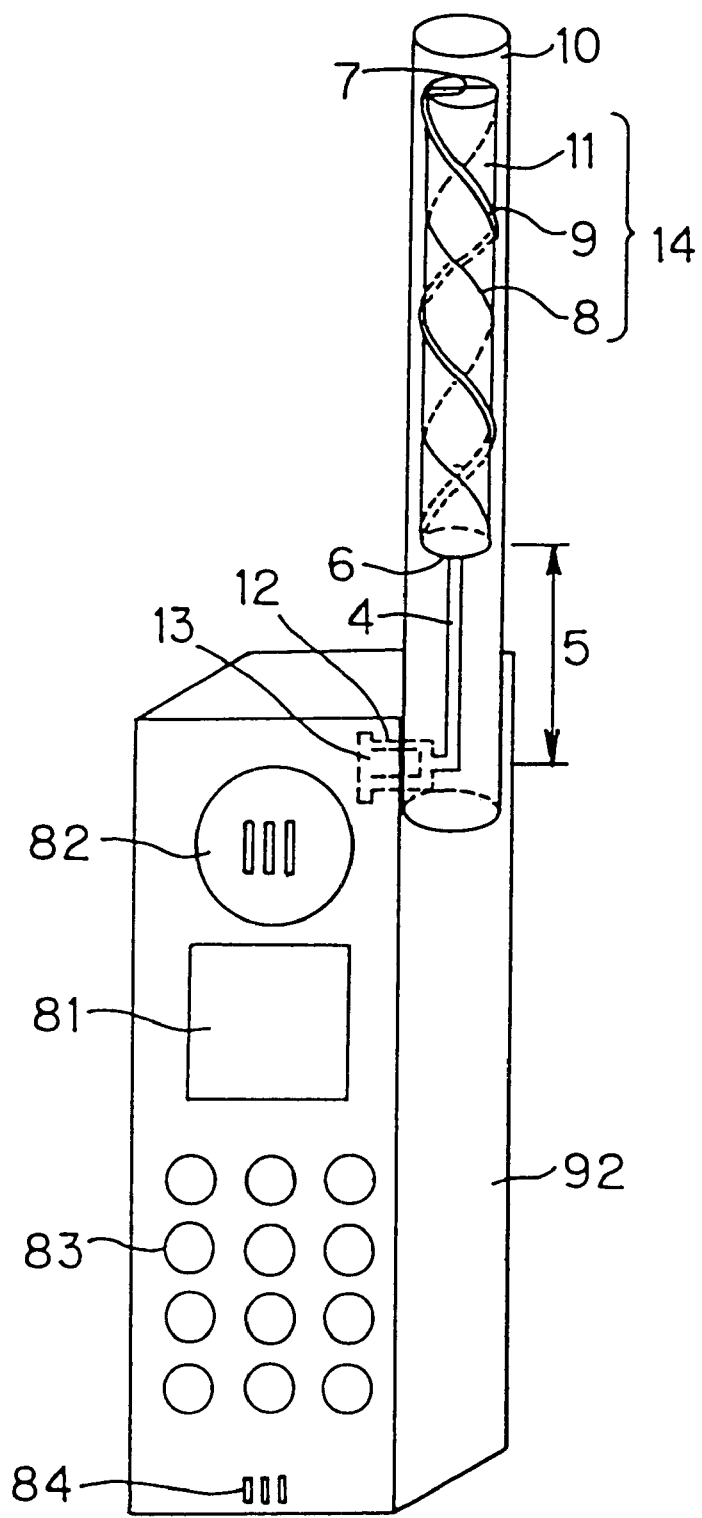
FIG. 1 is a diagram illustrative of a portable radio communication device, which is an of embodiment of the present invention.

FIG. 1 shows an embodiment of the present invention. Reference numeral 5 denotes a communicating section constructed of a coaxial line or a microstrip line. A circularly polarized helical antenna 14 constructed of a coaxial line 9 and the like is separated from a portable telephone 92 by the communicating section 5. It may be noted that reference numeral 81 denotes a display section; 82, a receiver; 83, an operating section; and 84, a transmitter.

First, the operation and characteristics of the helical antenna 14 that generates circularly polarized waves for satellite communication will be described. As the helical antenna 14, for example, a two-wire helical antenna (disclosed in Unexamined Japanese Patent Publication 3-274904) and the like are known. This two-wire helical antenna is employed in the present embodiment. The helical antenna 14 includes: the coaxial line 9 serving as a radiating element and a conductor 8, electrically couples the core conductor of the coaxial line 9 serving as the radiating element and the conductor 8 at a feed point 7, and electrically couples an outer conductor of the coaxial line 9 serving as the radiating element and the conductor 8 at the helix end 6. Reference numeral 11 denotes a dielectric cylinder, around which the coaxial line 9 and the conductor 8 are wound spirally.

The operation will be described based on high frequency current flowing through the helical antenna 14. The feed point 7 of the helical antenna 14 is located on top of the antenna. Nothing serving as an antenna element is connected to the outer conductor-of the coaxial line 9 serving as the radiating element. When high frequency current exiting from the core conductor of the coaxial line 9 at the feed point 7 is flowing upward from the helix end 6 on the outer wall side of the outer conductor of the coaxial line 9, current is flowing in an opposite direction on the inner wall side of the outer conductor of the coaxial line 9. Therefore, in nominal terms, no high frequency current is flowing on the outer conductor of the coaxial line 9. As a result, the high frequency current becomes a loop current. Since the conductor 8 and the coaxial line 9 are wound around the dielectric cylinder 11 spirally, the high frequency current produces an electric field along the helices and radiates circular polarization.

Then, during the operation of connecting the helical antenna 14 to the portable telephone 92, when the radiating element approaches the telephone housing, radiation pattern is disturbed. As a result, the performance of the antenna as an independent body is impaired, which in turn requires that the operation of matching the electromagnetic characteristics of both the housing and the antenna be performed. This operation impairs productivity. Further, the radiating element of the antenna nearing the telephone housing comes closer also to the head of a human body, and this makes it hard for the antenna to perform what it is expected to do. To overcome this problem, the communicating section 5 is arranged in an antenna holder 10 so that the antenna can perform what it is expected to do by reducing interference between the helical antenna 14 and the telephone housing. A sliding connector 13 is arranged on the upper right side surface of the portable telephone 92, and a sliding connector 12 is arranged on the side surface of the communicating section 5, so that the antenna holder 10 is releasable. The length of the communicating section 5 is designed to be about 20 to 100% of the physical length of the radiating element of the circularly polarized antenna, or to be about 0.1 to 0.5λ (wavelength) of the operating wavelength of the radiating element of the circularly polarized antenna.

Since the communicating section 5 is arranged in the antenna holder 10, the distance between the telephone housing and the helical antenna 14, and the distance between the head of a human body and the helical antenna 14 can be increased, which in turn allows appropriate antenna performance to be maintained. FIG. 2 shows a condition in which radiation from the antenna is not shielded by the head of a human body through the use of a portable telephone according to the present embodiment. It is understood from this drawing that antenna gain at low elevation angles necessary for communication with satellites in low earth orbit is not lost.

While a two-wire helical antenna is employed in the aforementioned embodiment, other types of helical antennas may be employed as well. For example, a four-wire helical antenna 15 having four conductors as a radiating element such as shown in FIG. 3A, a monofilar (one-wire) helical antenna constructed of a ground plane 17 and a conductor 16 such as shown in FIG. 3B, and the like can provide similar advantages as long as the communicating section 5 is arranged in the antenna holder 10.

It may be noted that an optimal type of helical antenna may be selected in accordance with the system in which a portable radio communication device is used. The helical antenna may be a rotating type or a pull-out type so that the helical antenna may be received in the housing of the radio communication device.

Further, while a coaxial line or a microstrip line is accommodated in the communicating section 5 arranged in the antenna holder 10 in the aforementioned example, the present invention is limited to this example, but may be applied to a case where the communicating section 5 is constructed of a coaxial line, a microstrip line, or the like. Further, while the antenna is designed to be releasable through the sliding connector 13 and the sliding connector 12, the present invention is not-limited to this design, but may be applied to a fixed antenna design as long as the communicating section 5 is provided.

Figure 4:
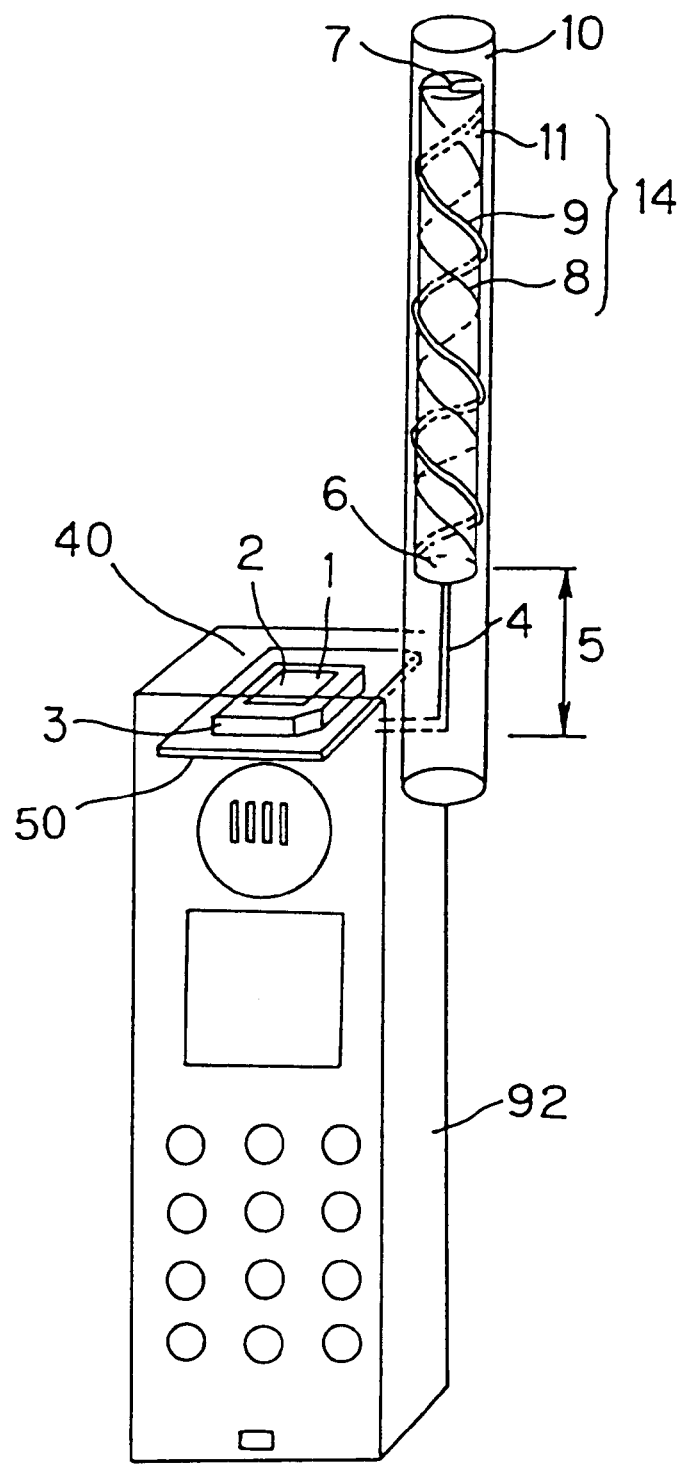
FIG. 4 is a diagram showing another embodiment of the present invention, in which a portable radio communication device has a flat antenna means and a helical antenna means mounted thereon.
Figure 7:
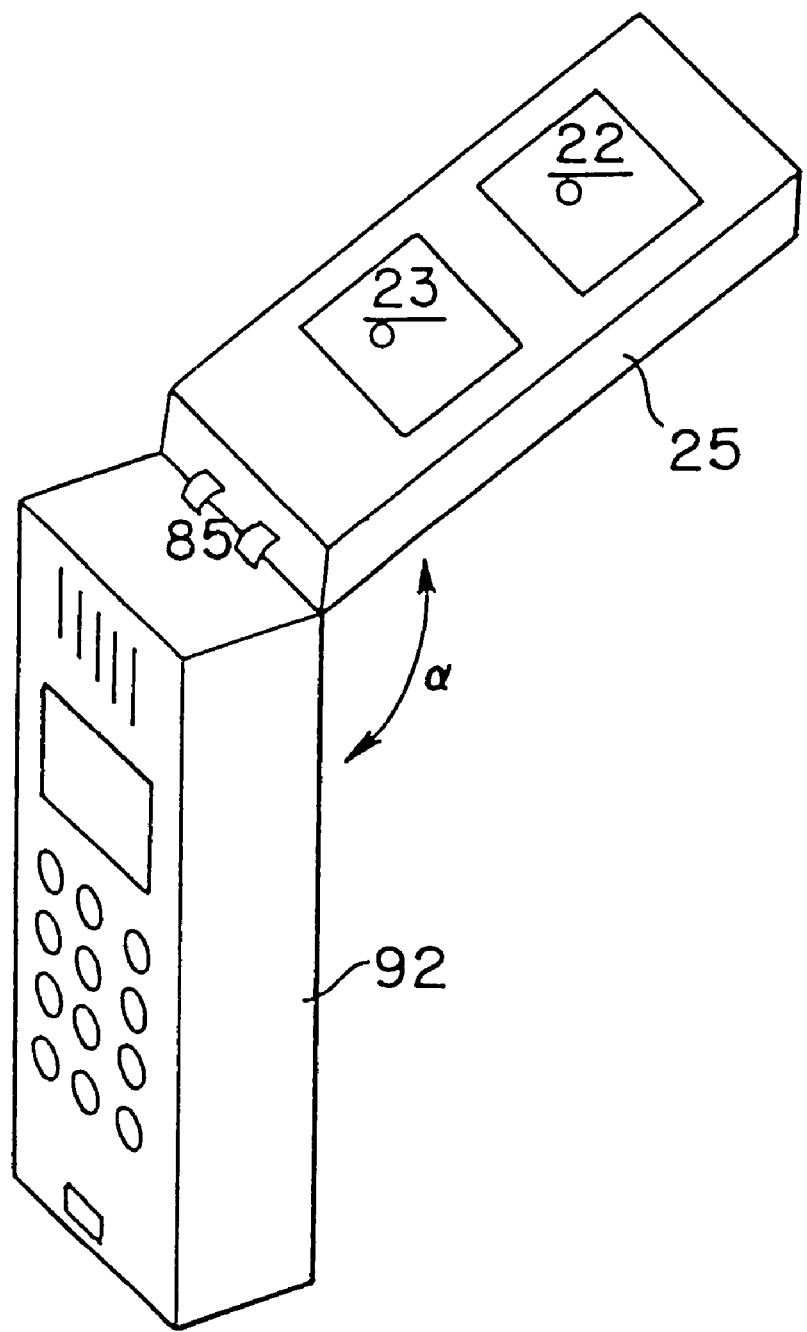
FIG. 7 is a diagram illustrative of a conventional portable radio communication device.

FIG. 4 shows another embodiment of the present invention. Parts corresponding to the embodiment shown in FIGS. 1 to 3 are assigned to the same reference numeral, and detailed description is omitted here. In FIG. 4, reference numeral 40 denotes a flat antenna means; 14, a helical antenna means; and 92, a portable radio communication device (portable telephone). The flat antenna means 40 is arranged on an upper surface portion of the housing of the potable radio communication device 92, and the helical antenna means 14 is arranged on an upper side surface portion of the housing so as to extend upward. FIG. 5 is a block diagram showing a circuit of the antennas. A signal synthesizer 32 is connected to a radio communication section 31. A signal selector may be used in place of the signal synthesizer 32. Both antennas have different main beam radiating directions, but have the same operating frequency band and the same rotating direction of circular polarization.

The flat antenna means 40 is constructed so that a patch-like conductor 2 is bonded onto the upper surface of a dielectric sheet 3 and that a ground plane (not shown) is bonded onto the lower surface of the dielectric sheet 3. A through hole (not shown) is arranged in the dielectric sheet 3. A feed pin 1 is inserted into the through hole to thereby electrically connect the feed pin 1 to the patch-like conductor 2. At this time, a conductor portion around the through hole is removed to prevent the feed pin 1 from contacting with the ground plane. Similarly, a through hole is arranged in a conductor plate 50, and it is arranged so that the conductor plate 50 does not come in electric contact with the feed pin 1. The conductor plate 50 is slightly larger than the flat antenna means 40 in size. The commonest shape of the patch-like conductor 2 is substantially square. The patch-like conductor 2 resonates at low frequencies in the direction of a long side and at high frequencies in the direction of a short side. That is, the patch-like conductor 2 resonates at two different frequencies, and operates as a circularly polarized antenna between two different frequencies. Impedance matching is provided by adjusting the position of the feed pin 1.

The main beam of the flat antenna means 40 is generally directed toward the zenith (FIG. 6A), and therefore degree of design freedom is restricted (there is some degree of design freedom, depending on the size of the conductor plate 50). On the other hand, a large degree of design freedom is given to the helical antenna means 14. It is possible to select winding conditions so that the main beam is directed at low elevation angles (FIG. 6B). By combining these two types of directive antennas and arranging them on the portable radio communication device in such a manner as shown in FIG. 4, stable communication sensitivity can be provided raging from a high elevation angle (toward the zenith) to a low elevation angle (FIG. 6C).

Further, the helical antenna means 14 shown in FIG. 1 is accommodated and held in an antenna holding tube 10. The helical antenna means 14 is held at a position that is distant from the upper portion of the portable radio communication device 92 while interposing a signal transmission path (a coaxial line 4 or a microstrip line) between the portable radio communication device 92 and the helical antenna means 14, the signal transmission path being led from the radio communication section 31. Since the main beam of the helical antenna means (two-wire helical antenna) 14 is directed at a low elevation angle, loss in antenna gain brought about by the head of a human body can be prevented by holding the helical antenna means 14 above the portable radio communication device 92 so as to be distant from the portable radio communication device 92.

While a square microstrip flat antenna has been exemplified as the flat antenna in the aforementioned embodiment, a triangular, pentagonal, or circular microstrip antenna may also be used. Further, while one-point back feeding has been exemplified as the feed system, any one of two-point back feeding, and one-point feeding or two-point feeding to the peripheral of a patch may also be chosen. Still further, a spiral antenna may also be employed.

While a two-wire helical antenna has been exemplified as the helical antenna, a four-wire helical antenna as shown in FIG. 3A, a monofilar (one-wire) helical antenna as shown in FIG. 3B, a three-wire helical antenna, and the like may also be chosen in accordance with the communications satellite system.

Further, loss in the antenna gain of a flat antenna caused by the head of a human body may be prevented by arranging the flat antenna on the top end portion of a helical antenna, which is fixed to the antenna holding tube. A signal transmission path is provided in the antenna holding tube to feed the signal to the flat antenna.

As described in the foregoing, the present invention is characterized as providing a communicating section that transmits a signal between a portable radio communication device and a circularly polarized antenna that is arranged above the portable radio communication device. As a result of this arrangement, not only satisfactory satellite communication is permitted, but also productivity can be improved.

Further, in a satellite communication system that requires satellite handover (switching from one satellite to another) at low elevation angles, reliability in communications at low elevation angles can be improved.

Independently of elevation angles of communications satellites as viewed from the ground, satisfactory communication sensitivity can be obtained easily. In addition, handover from a satellite at a high elevation angle to a satellite at a low elevation angle (and vice versa) can be implemented smoothly.

What is claimed is:

1. A portable radio communication device comprising:

a communication section for transmitting a signal arranged at an upper portion of a housing of the radio communication device, the housing accommodating a radio communication section therein; and a radiating element of a chokeless circularly polarized antenna held on the communication section such that the entire radiating element is held away from the housing, wherein the radiating element of the circularly polarized antenna is a radiating element of an antenna having an antenna gain at low elevation angles for communication with satellites in low earth orbit, wherein a main beam of the circularly polarized antenna is directed at a low elevation angle, and wherein the communication section holds the circularly polarized antenna at a height such that a communication with a satellite at a low elevation angle is not substantially obstructed by a user's head.

2. A portable radio communication device comprising:

a communication section for transmitting a signal arranged at an upper portion of a housing of the radio communication device, the housing accommodating a radio communication section therein;

a radiating element of a first chokeless circularly polarized antenna held on the communication section such that the entire radiating element is held away from the housing, wherein the radiating element of the circularly polarized antenna is a radiating element of an antenna having an antenna gain at low elevation angles for communication with satellites in low earth orbit, wherein a main beam of the first circularly polarized antenna is directed at a low elevation angle, and wherein the communication section holds the circularly polarized antenna at a height such that a communication with a satellite at a low elevation angle is not substantially obstructed by a user's head; and a second chokeless circularly polarized antenna, wherein a main beam of the second circularly polarized antenna is directed at a high elevation angle.

3. A portable communication device according to claim 2, wherein the second circularly polarized antenna is a flat antenna and the first circularly polarized antenna is a helical atenna, a conductor surface of a patch of the flat antanna and a top end portion of the helical atenna being directed upward with respect to a housing of the radio communication device.

4. A portable radio communication device according to claim 3, wherein the flat antenna is fixed to the top end portion of the helical atenna.

5. A portable radio communication device according to claim 3, wherein the helical antenna is supported at the upper portion of the housing of the radio communication device so as to be distant from the upper portion of the housing while interposing a signal transmission path between the helical antenna and the upper portion of the housing.

* * * * *